US011858153B2

(12) United States Patent
Iaccarino et al.

(10) Patent No.: US 11,858,153 B2
(45) **Date of Patent: *Jan. 2, 2024**

(54) SPACING COMB AND HAIR CUTTING APPLIANCE

(71) Applicant: KONINKLIJKE PHILIPS N.V., Eindhoven (NL)

(72) Inventors: Luca Iaccarino, Groningen (NL); Theunis Quaak, Zuidhorn (NL); Kam Hing Yau, Groningen (NL); Rob Roetert, Groningen (NL); Alwin William De Vries, Zuidlaren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,639

(22) Filed: Feb. 3, 2022

(65) Prior Publication Data

US 2022/0152851 A1 May 19, 2022

Related U.S. Application Data

(63) Continuation of application No. 16/611,882, filed as application No. PCT/EP2018/062410 on May 14, 2018, now Pat. No. 11,312,032.

(30) Foreign Application Priority Data

May 15, 2017 (EP) .................................... 17171051

(51) Int. Cl.
*B26B 19/20* (2006.01)
*B26B 19/38* (2006.01)
*B26B 19/06* (2006.01)

(52) U.S. Cl.
CPC .......... *B26B 19/20* (2013.01); *B26B 19/3813* (2013.01); *B26B 19/06* (2013.01)

(58) Field of Classification Search
CPC . B26B 19/20; B26B 19/3813; B26B 19/3826; B26B 19/06; B26B 19/063;
(Continued)

(56) References Cited

U.S. PATENT DOCUMENTS 2,878,563 A * 3/1959 Schmoyer ........... B26B 19/3813 30/539
3,008,233 A * 11/1961 Waggoner ........... B26B 19/3813 30/537
(Continued)

FOREIGN PATENT DOCUMENTS

CN 203185377 9/2013
CN 303705092 6/2016
(Continued)

OTHER PUBLICATIONS

International Search Report and Written Opinion dated Aug. 20, 2018 for International Application No. PCT/EP2018/062410 Filed May 14, 2018.

*Primary Examiner* — Nhat Chieu Q Do

(57) ABSTRACT

A spacing comb for a hair cutting appliance. The comb includes a support frame, a series of comb teeth each having a frontal portion and a rear portion, wherein the comb teeth extend from the support frame. The support frame includes a frontal connector bar and a rear connector plate, wherein the frontal portions of the comb teeth extend from the frontal connector bar. The frontal connector bar is inwardly curved towards the rear connector plate, such that a central portion of the frontal connector bar is rearwardly offset from lateral portions thereof. Also described herein is a hair cutting appliance that is equipped with such a spacing comb.

17 Claims, 6 Drawing Sheets

(58) Field of Classification Search
CPC ..... B26B 19/38; B26B 19/3806; B26B 21/42; B26B 21/4037
USPC ..................................... 30/200, 539; D28/54
See application file for complete search history.

(56) References Cited

U.S. PATENT DOCUMENTS

| | | | | | |
|---|---|---|---|---|---|
| 3,107,423 | A * | 10/1963 | Caesar | B26B 19/20 | 30/537 |
| 3,149,418 | A * | 9/1964 | Milbourne | B26B 19/20 | 30/201 |
| 3,178,815 | A * | 4/1965 | Madrid | B26B 19/3813 | 30/286 |
| 4,498,237 | A | 2/1985 | Mack | | |
| 4,614,036 | A * | 9/1986 | Haraguchi | B26B 19/205 | 30/200 |
| 5,050,305 | A * | 9/1991 | Baker | B26B 19/20 | 30/201 |
| 5,185,931 | A | 2/1993 | Fujikawa | | |
| D619,304 | S * | 7/2010 | Shen | D28/54 | |
| 7,921,566 | B2 * | 4/2011 | Yamaguchi | B26B 19/06 | 30/233.5 |
| D790,769 | S * | 6/2017 | Drori | D28/54 | |
| 10,442,097 | B2 * | 10/2019 | Bozikis | B26B 21/4037 | |
| 2003/0136006 | A1 * | 7/2003 | Lin | B26B 19/22 | 30/195 |
| 2005/0138817 | A1 * | 6/2005 | Yamaguchi | B26B 19/20 | 30/233 |
| 2006/0042095 | A1 * | 3/2006 | Yamaguchi | B26B 19/3853 | 30/201 |
| 2011/0005089 | A1 * | 1/2011 | Sennett | B26B 21/4037 | 30/539 |
| 2013/0199346 | A1 * | 8/2013 | Psimadas | B26B 21/225 | 83/13 |
| 2013/0263457 | A1 * | 10/2013 | Sobagaki | B26B 19/20 | 30/201 |
| 2014/0215832 | A1 * | 8/2014 | Julemont | A45D 24/36 | 30/200 |
| 2018/0222067 | A1 * | 8/2018 | Millis | B26B 19/06 | |
| 2018/0345510 | A1 * | 12/2018 | Julemont | B26B 19/3813 | |
| 2019/0118397 | A1 * | 4/2019 | Drori | B26B 21/4037 | |

FOREIGN PATENT DOCUMENTS

| | | |
|---|---|---|
| EP | 1632321 | 3/2006 |
| GB | 2245211 | 1/1992 |
| WO | 2005108021 | 11/2005 |
| WO | 2008023529 | 2/2008 |
| WO | 2013182475 | 12/2013 |
| WO | 2014103178 | 7/2014 |
| WO | 2016/071144 | 5/2016 |
| WO | 2017/021202 | 2/2017 |
| WO | 2017021202 | 2/2017 |

* cited by examiner

SPACING COMB AND HAIR CUTTING APPLIANCE

CROSS REFERENCE TO RELATED APPLICATIONS

This application is a continuation of U.S. application Ser. No. 16/611,882 filed Nov. 8, 2019, published as US2020/0094425A1 on Mar. 26, 2020, which is the U.S. National Phase application under 35 U.S.C. § 371 of International Application No. PCT/EP2018/062410 filed May 14, 2018, published as WO 2018/210766 on Nov. 22, 2018, which claims the benefit of European Patent Application Number 17171051.0 filed May 15, 2017. These applications are hereby incorporated by reference herein.

FIELD OF THE INVENTION

The present disclosure relates to a spacing comb for a hair cutting appliance, the spacing comb comprising a support frame and a series of comb teeth extending from the support frame, wherein the comb teeth define a top surface of the spacing comb that is arranged as a skin contact surface when the hair cutting appliance is used for trimming or clipping purposes to define an offset between the skin and the blade set of the hair cutting appliance.

The present disclosure further relates to a hair cutting appliance that is equipped with a respective spacing comb.

More particularly, but not to be understood in a limiting sense, the present disclosure relates to improvements in the shape of spacing combs that have a positive effect on the hair removal behavior of the appliance when the spacing comb is fitted thereto.

BACKGROUND OF THE INVENTION

Hair cutting appliances, particularly electric hair cutting appliances, are generally known and may include trimmers, clippers and shavers. Electric hair cutting appliances may also be referred to as electrically powered hair cutting appliances. Electric hair cutting appliances may be powered by electric supply mains and/or by energy storages, such as batteries, for instance. Electric hair cutting appliances are generally used to trim or cut (human) body hair, in particular facial hair and head hair to allow a person to have a well-groomed and well-styled appearance. Frequently, electric hair cutting appliances are also used for cutting animal hair.

EP 1 632 321 A1 discloses an adjustable comb for a hair cutting appliance, wherein the comb is provided with a comb-vibration preventing structure that comprises an elastic member for urging opposite inner side surfaces of the comb in an outward thrusting manner in an opposite lateral direction when the comb is attached.

CN 203 185 377 U discloses a hair cutting appliance having an adjustable comp that can be displaced by an adjustment mechanism.

U.S. Pat. No. 4,498,237 A discloses a hair cutting appliance comprising a blade set and a comb covering that blade set, wherein the comb comprises comb teeth that are associated with a stationary blade of the blade set when the comb is attached.

WO 2017/071144 A1 discloses a hair clipping device comprising a housing; a cutting assembly which comprises a stationary cutting blade and a moveable cutting blade; a drive arrangement for driving the moveable cutting blade relative to the stationary cutting blade in an oscillatory movement along a first axis, a comb support element for removably attaching a comb attachment with a plurality of comb teeth, and an adjustment unit for adjusting the position of the comb attachment relative to the cutting assembly when the comb attachment is attached to the comb support element, wherein the adjustment unit is configured to increase a distance between the comb attachment and the cutting assembly during an extension movement of the adjustment unit, and to decrease the distance between the comb attachment and the cutting assembly during a retraction movement of the adjustment unit.

A comb for a hair cutting appliance, particularly a spacing comb, may be generally arranged as one of an attachable comb and an integrally formed comb. A spacing comb generally spaces a blade set of the hair cutting appliance away from the skin when the appliance is moved in a moving direction with respect to the skin during operation. Consequently, the spacing comb may enable to cut hair to a desired length, i.e., to a desired length of remaining hair at the skin.

It has been observed that the hair removal capacity is a considerably important factor for the appliance's overall clipping/trimming performance. In particular when relatively long hair is clipped to a desired length, the severed hair clippings may obstruct the gap between the appliance's housing and/or blade set and the spacing comb that is attached thereto. Hence, there may be a certain vulnerability to hair clogging in the gap between the appliance and the spacing comb. This may result in a reduced operating performance or even in user discomfort as there is a certain likelihood of hair pulling when hair removal channels or gaps are considerably filled and obstructed with hair clippings so that there is no sufficient room for further hairs.

There exist certain design principles for spacing combs for hair clippers and hair trimmers. By way of example, the hair cutting appliances are often designed to be operable without any attachment comb. Hence, hair cutting close to the skin is enabled, thereby achieving a minimum remaining hair length.

When a spacing comb is attached to the hair cutting appliance, most of all, a certain spacing between the skin and the cutting edges of the blade set of the appliance should be provided. This is the primary function of the attachment comb. Further, the spacing comb and particularly comb teeth thereof are preferably arranged to adequately condition the hair and the skin before the cutting procedure. This may have a positive effect on operating performance and user comfort.

To this end, comb teeth of the spacing comb are often provided in a two-portion design having a frontal portion and a rear portion. The rear portions of the comb teeth typically contact or face a top side of a guard blade of the blade set, and defines at least one of the desired spacing and a beneficial operating angle of the blade set of the appliance with respect to the skin. The frontal portion of the comb teeth is further designed to reduce skin irritations and to enable a smooth sliding movement of the appliance along the skin. To this end, the frontal portions of the comb teeth are generally considerably rounded to reduce contact forces.

A further constraint may be that the spacing comb is adjustable to adjust the cutting length of the appliance when the spacing comb is attached thereto. Hence, particularly the rear portions of the comb teeth may be lifted away from the guard of the blade set. As a result, also the frontal portions of the comb teeth are moved with respect to the teeth of the guard blade and the cutter blade of the blade set. As the adjustment movement for the spacing comb is at least partially in a vertical direction that is perpendicular to a cutting plane jointly defined by the cutter blade and the guard blade of the blade set, the frontal portions of the comb teeth generally have a considerably large vertical extension to ensure that the cutting edges of the teeth of the blade set are well covered in any adjustment position of the spacing comb.

As a result, in a fully retracted position of the spacing comb, a linking bar from which the frontal portions of the comb teeth extend is displaced downwards from the teeth of the blade set by an offset that is often similar to or greater than an adjustment range of the spacing comb. It is assured in this way that even in a fully extracted state of the spacing comb, the teeth of the blade set of the appliance are, in a front view, not obstructed by the linking bar for the frontal portions of the comb teeth.

A further boundary condition is that the teeth of the cutter blade and the guard blade are regularly arranged in a linear or nearly linear series. As a result, also the respective arrangement of teeth of the comb is linear or nearly linear. However, nowadays the housing portion of hair cutting appliances is often provided with a rounded and/or curved contour to facilitate handling and operating the appliance, and to comply with industrial design requirements.

Hence, the "interfacing contour" defined by the housing portion and the blade set of the appliance for the spacing comb is somewhat uneven, particularly when taking into consideration that the spacing comb is arranged to be moved with respect to the appliance for length adjustment purposes.

Therefore, it has been observed that conventional spacing combs may have a certain tendency to hair clogging, dependent on the operation conditions.

There is thus still room for improvements in spacing combs for hair cutting appliances.

SUMMARY OF THE INVENTION

It is an object of the present disclosure to provide a spacing comb for a hair cutting appliance that improves the overall trimming or clipping performance of the appliance by increasing the hair removal capacity. Preferably, the spacing comb is arranged in such a way that the likelihood of hair clogging is significantly reduced. Preferably, the design of the spacing comb is adapted to hair clippings that result from standard (temporal) trimming or grooming intervals, for instance hair trimming/beard trimming every third or fourth day.

It is a further object of the present disclosure to provide a hair cutting appliance that is arranged to be equipped with a spacing comb, wherein the hair cutting appliance and the spacing comb are arranged to jointly define an appropriate hair removal contour between the spacing comb and the appliance's housing. Preferably, a certain hair removal capacity is maintained regardless of the current adjustment state of the spacing comb with respect to the blade set of the appliance.

In a first aspect of the present disclosure a spacing comb for a hair cutting appliance is presented, the comb comprising:

- a support frame,
- a series of comb teeth each having a frontal portion and a rear portion,
- wherein the comb teeth extend from the support frame,
- wherein the support frame comprises a frontal connector bar and a rear connector plate,
- wherein the frontal portions of the comb teeth extend from the frontal connector bar,
- wherein the frontal connector bar is inwardly curved towards the rear connector plate, such that a central portion of the frontal connector bar is rearwardly offset from lateral portions thereof.

In another, more general aspect of the present disclosure a spacing comb for a hair cutting appliance is presented, the comb comprising:

- a support frame,
- a series of comb teeth each having a frontal portion and a rear portion,
- wherein the comb teeth extend from the support frame,
- wherein the support frame comprises a frontal connector bar,
- wherein the frontal portions of the comb teeth extend from the frontal connector bar,
- wherein the frontal connector bar is inwardly curved, such that a central portion of the frontal connector bar is rearwardly offset from lateral portions thereof.

In certain embodiments, the frontal connector bar is inwardly curved towards a housing of the appliance, when the spacing comb is mounted thereto. Hence, the appliance's housing, including a cutting head, and the spacing comb including the frontal connector bar and the frontal portions of the comb teeth may define therebetween a hair removal gap.

Major aspects of the present disclosure are based on the insight that the support frame may be shaped in such a way that the hair removal capacity may be improved without affecting the required shape of the teeth of the comb that is necessary to maintain the cutting performance.

In certain embodiments, the rear connector plate is rearwardly offset from the frontal connector bar. At least in certain embodiments, the rear connector plate may be referred to as rear connector bar. The rear connector plate does not necessarily have to be arranged as rear end portion of the comb. Rather, the rear connector plate is rearwardly offset from the frontal connector bar and may thus be arranged between the frontal end and the rear end of the structure forming the comb.

As used herein, the terms front and rear indicate respective portions of the blade set/comb combination. The front side is the leading side when the appliance is moved forwards over the skin to cut hair. The rear side is the opposite, tailing side. Hence, in certain embodiments, the frontal connector bar and the rear connector plate/bar are spaced away from one another in a direction that is basically parallel to a top surface of the comb that contacts the user's skin. The frontal connector bar is arranged in front of the rear connector plate/bar. The rear connector plate/bar is arranged rearwards of the frontal connector bar In certain embodiments, the frontal connector bar is inwardly and rearwardly curved towards an opposite rear connector plate of the support frame.

In certain embodiments, the frontal connector bar is bow-shaped or concavely curved as seen from the frontal end. In other words, the frontal connector bar is inwardly curved towards the housing portion of the appliance, when the comb is mounted thereto.

Preferably, the rear face of the central portion of the frontal connector bar is rearwardly offset from the rear faces of the lateral portions thereof. In this way, a hair removal channel may be defined between the appliance and the comb that gets wider towards lateral end of the comb. Hence, also hair clippings that are produced in the central region of a blade set of the appliance may be discharged through the hair removal channel without having to pass a considerably obstructed portion that would quite likely cause hair clogging.

In certain embodiments, the curvature of the frontal connector bar is present in a plane that is basically parallel to the top surface of the comb. Hence, between the central portion and the lateral portions there is an offset in that plane.

The rear portions of the comb teeth cover a top surface of a guard blade of the blade set. The frontal portions of the comb teeth are frontwardly spaced from the teeth of the blade set for hair conditioning/skin conditioning purposes. The frontal portions and the frontal connector bar form a front part of the spacing comb. The rear portions of the comb teeth belong to a rear part of the spacing comb.

In some embodiments, the comb comprises a blade slot between the frontal portions and the rear portions of the teeth, wherein the blade set extends into the blade slot in at least one operating position of the comb. Between the front part and the rear part, the blade slot is provided that separates the frontal portions and the rear portions of the comb teeth.

However, the above does not exclude that the comb comprises continuously extending teeth wherein the frontal portions and the rear portion are directly connected to one another. In these embodiments, a blade recess that does not form an interrupting slot may be provided at the bottom side of the teeth.

The frontal connector bar is inwardly curved (towards the appliance) which has the benefit that hair clippings that arise in the central region of the spacing comb may be removed or discharged via lateral ends of the spacing comb without having to pass a bottleneck as in the central portion a narrowing is provided due to the inwardly curved shape of the frontal connector bar and, at least in some embodiments, an opposed curved outer surface or shell of the housing of the hair cutting appliance.

Generally, the comb teeth of the spacing comb may have a main orientation direction that is parallel to a main orientation direction of teeth of any of the cutter blade (movable blade) and the guard blade (stationary blade) of the blade set.

In an exemplary embodiment of the comb, the frontal connector bar is provided with a concave shape, seen in a top view, wherein the frontal portions of the comb teeth define frontal tips and rear faces that are arranged in a line that is linear or curved, and wherein a curvature of a connecting line of the rear faces is smaller than a curvature of the frontal connector bar.

In other words, the frontal connector bar is bulged towards the rear end. Further, the rear faces of the frontal portions of the comb teeth are facing the frontal tips of the teeth of the blade set, in at least one operation state of the comb. Preferably, a parallel alignment of the tips of the blade set and the rear faces of the frontal portions of the comb teeth is provided. However, in the region of the frontal connector bar, a curved shape may be provided without an adverse effect on the basic cutting performance. Hence, hair catching and skin conditioning features may be maintained whereas hair removal capacity may be improved.

In a further exemplary embodiment of the comb, the frontal portions of the comb teeth are arranged in series and define, at a rearwardly facing side thereof, a first region and a second region, wherein, seen in a top view, the first region is rearwardly curved and the second region is planar. The second region is primarily formed by the rear faces of the frontal portions of the comb teeth that are rearwardly facing and therefore facing the frontal tips of the teeth of the blade set. The second region is formed by blunts of the frontal portions of the comb teeth and by the frontal connector bar from which the frontal portions extend.

At the rear side of the front part of the spacing comb, an envelope surface may be defined by the first region and the second region that is basically planar in the first region and basically rearwardly curved in the second region. Seen from the hair removal gap, the second region is convexly shaped.

In yet another exemplary embodiment of the comb, the rear connector plate is opposite to the frontal connector bar, wherein the support frame comprises two side bars extending between the frontal connector bar and the rear connector plate, wherein the rear portions of the comb teeth extend from the rear connector plate, wherein the frontal portions and the rear portions of the comb teeth jointly define a top surface of the comb, and wherein the side bars are inclined with respect to the top surface.

In some conventional spacing combs, a front part and a rear part is provided wherein a blade slot is formed therebetween, and wherein side bars are provided that connect the front part and the rear part and that are arranged at a top end of the comb and therefore not inclined with respect to the top surface.

Implementing the inclined design of the side bars with respect to the top surface has the effect that, seen in a lateral view, a hair removal channel laterally extending throughout the spacing comb is formed. Hence, hair removal is further facilitated.

In a further exemplary embodiment of the comb, seen in a lateral view, the comb is unobstructed in a hair removal region adjacent to the top surface. In other words, a clearance profile may be provided is laterally extruded throughout the whole spacing comb. For instance, the clearance profile may have a polygonal shape, seen in a lateral view, that is extruded throughout the spacing comb in the lateral direction.

In yet another exemplary embodiment of the comb, the frontal connector bar is downwardly offset from the top surface, wherein the side bars are arranged at an angle with respect to the top surface to connect the frontal connector bar and the rear connector plate. The frontal connector bar forms a bottom end of the frontal portions of the comb teeth.

Hence, an offset (vertical offset) between the frontal connector bar and the rear connector plate is provided. In the vertical direction (perpendicular to the top surface and/or to a cutting plane defined by the blade set), the frontal portions of the comb teeth are significantly greater than the rear portions thereof. The frontal connector bar is not connected to the side bars in the vicinity of the top surface, but at a distance therefrom. Hence, adjacent to the top surface, the blade slot is part of a cutout that extends throughout the whole spacing comb in the lateral direction.

In a further exemplary embodiment of the comb, the side bars are arranged at an angle of between 30° and 60° with respect to the top surface, preferably or at an angle of between 40° and 50°. Hence, due to the inclination of the side bars, a vertical offset between the frontal connector bar and the rear connector plate is possible without the need of forming a linking geometry at the top surface. Needless to say, also the side bars may be somewhat curved.

In yet another exemplary embodiment of the comb, the rear connector plate is arranged at a bracket comprising the rear connector plate from which the rear portions of the comb teeth extend, a central portion and two side walls to which the side bars are connected, wherein the side bars connect the frontal connector bar and the side walls and bridge an offset therebetween. The offset is an offset perpendicular to the top surface, i.e., a vertical offset.

In yet another exemplary embodiment, the comb further comprises two sliding beams extending from the side walls of the rear connector plate, wherein the two sliding beams are arranged to be inserted in a mounting slot or receptacle of the appliance. Also, the sliding beams do not obstruct or narrow the hair removal geometry. When the cutting length is adjusted, the sliding beams are extracted or retraced.

In yet another exemplary embodiment, the comb further comprises a first outer tooth at a first lateral end and a second outer tooth at a second lateral end, the first outer tooth and the second outer tooth each having a frontal portion and a rear portion, wherein the series of comb teeth are arranged between the first outer tooth and the second outer tooth, and wherein the side bars are separated (preferably laterally offset) from the outer teeth and form lateral end pieces of the comb.

In conventional spacing combs, quite likely the outer teeth would be used to integrally form the side bars. However, it has been observed that this conventional design approach would result in a laterally obstructed hair removal channel. It is therefore beneficial to separate the outer teeth from the side bars.

In yet another aspect of the present disclosure there is presented a hair cutting appliance, particularly a hair trimmer or clipper, comprising a housing portion, a cutting unit including a blade set, and a spacing comb in accordance with at least one embodiment as described herein, wherein the comb is arranged to be attached to the housing portion in such a way that a hair removal gap between the housing portion and a front part of the comb is formed.

A rear boundary of the hair removal gap is formed by a frontal end of the housing portion. A frontal boundary of the hair removal gap is formed by the rear sides/faces of the frontal portions of the comb teeth and the frontal connector bar.

In an exemplary embodiment of the appliance, the hair removal gap has a first clearance at the central portion and a second clearance at the lateral portions of the frontal connector bar, wherein the second clearance is greater than the first clearance. It is ensured in this way that hair clippings in the central portion may be discharged without having to pass a narrowing.

In yet another exemplary embodiment of the appliance, the housing portion is convexly shaped in a region adjacent to the front part. In other words, the housing portion is outwardly curved, i.e., bulged to the front end. The convexly shaped housing portion faces the convexly shaped rear contour of the front part of the spacing comb (that is concavely shaped of the frontal end of the comb).

In yet another exemplary embodiment of the appliance, the hair removal gap is, in a bottom view, funnel-shaped comprising a narrowing first funnel portion and a widening second funnel portion arranged between a first lateral end and a second lateral end, wherein the first funnel portion and the second funnel portion are opposite and face one another, and wherein narrow sections of the first funnel portion and the second funnel portion merge into one another. Hence, a double funnel shape of the hair removal channel is provided, wherein the mouths of the funnels are formed at the lateral ends of the comb.

Generally speaking, a biconcave top profile of the hair removal channel may be provided in this way.

In yet another exemplary embodiment of the appliance, the blade set comprises a cutter blade and a guard blade, wherein the comb is adapted to fit over teeth of the cutter blade and teeth of the guard blade, wherein tips of the teeth of the cutter blade are arranged in series, wherein frontal tips of the comb teeth are arranged in series, and wherein the series of comb teeth tips and the series of cutter blade tips are parallel to one another.

Hence, the biconcave arrangement of the hair removal channel does not have an adverse influence on the cutting performance and the cutting precision.

According to yet another aspect of the present disclosure, a hair cutting appliance, particularly a hair trimmer or clipper, is presented, wherein the hair cutting appliance comprises a housing portion, a cutting unit including a blade set, and a spacing comb in accordance with at least some embodiments of the present disclosure. Generally, the hair cutting appliance may be regarded as an electrically powered hair cutting appliance. Consequently, a motor may be provided for driving the blade set. Typically, the blade set may comprise a stationary blade (guard blade) and a movable blade (cutter blade), wherein the movable blade is movable with respect to the stationary blade. The movable blade may be driven with respect to the stationary blade, particularly oscillatingly driven. The movable blade and the respective stationary blade may comprise cutting edges that may cooperate to cut hair.

Generally, the hair cutting appliance may comprise an elongated housing comprising a first end and a second end which is opposite to the first end. At the first end (top end) of the housing, a cutting head may be arranged. The second end of the housing may also be referred to as handle end.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE INVENTION

Figure 1:
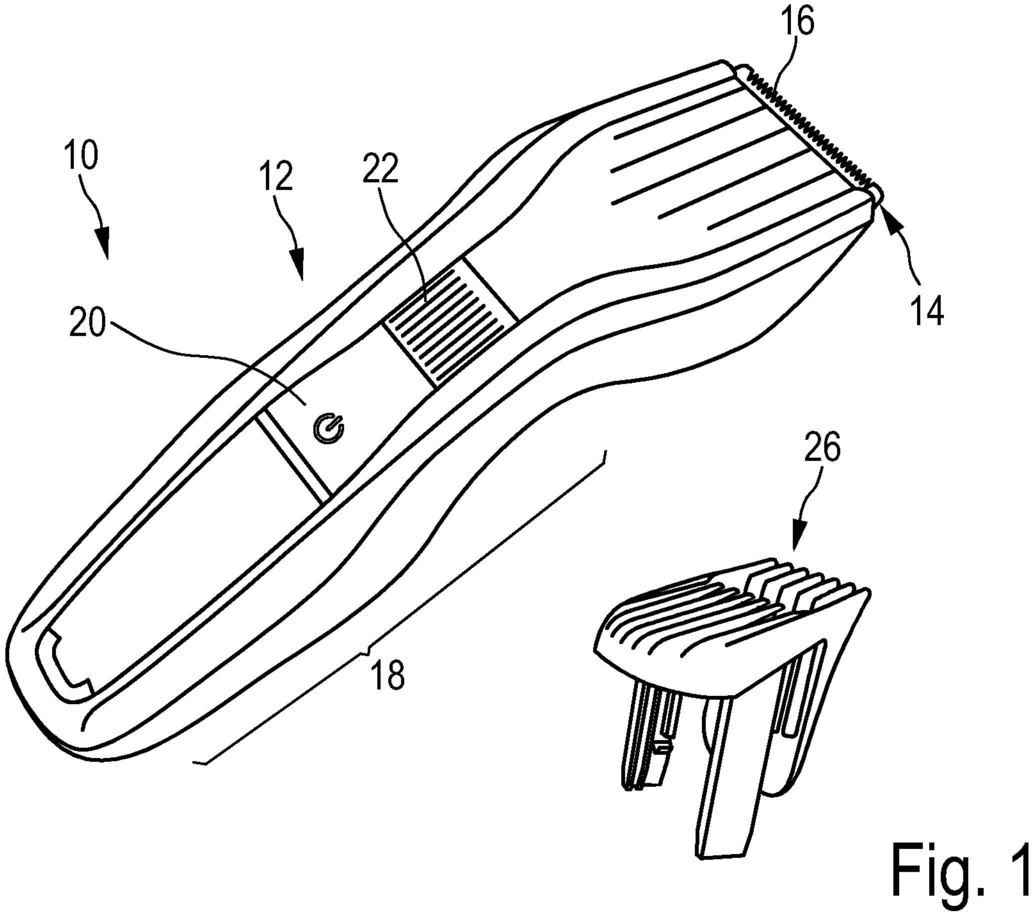
FIG. 1 shows a schematic perspective view of an exemplary electric hair cutting appliance and an adjustable spacing comb for the hair cutting appliance, wherein the spacing comb is shown in a detached state.

FIG. 1 shows a schematic perspective view of a hair cutting appliance 10, particularly an electrically-operated hair cutting appliance 10. The hair cutting appliance 10 may also be referred to as hair clipper or hair trimmer. The hair cutting appliance 10 may comprise a housing or housing portion 12 having a generally elongated shape. At a first end thereof, a cutting unit 14 may be provided. The cutting unit 14 may comprise a blade set 16. The blade set 16 may comprise a movable blade and a stationary blade that may be moved with respect to each other to cut hair. At a second end of the housing portion 12, a handle or grip portion 18 may be provided. A user may grasp or grab the housing at the grip portion 18.

The hair cutting appliance 10 may further comprise operator controls. For instance, an on-off switch or button 20 may be provided. Furthermore, a length adjustment control 22 may be provided at the housing 12 of the hair cutting appliance 10. The length adjustment control 22 may be provided in case an adjustable spacing comb 26 is attached to the housing portion 12 of the hair cutting appliance 10. In FIG. 1, the adjustable spacing comb 26 is shown in a detached or released state. When the spacing comb 26 is detached from the hair cutting appliance 10, a minimum cutting length may be achieved. When the spacing comb 26 is attached to the hair cutting appliance 10, hairs can be cut to a desired length.

Figure 2:
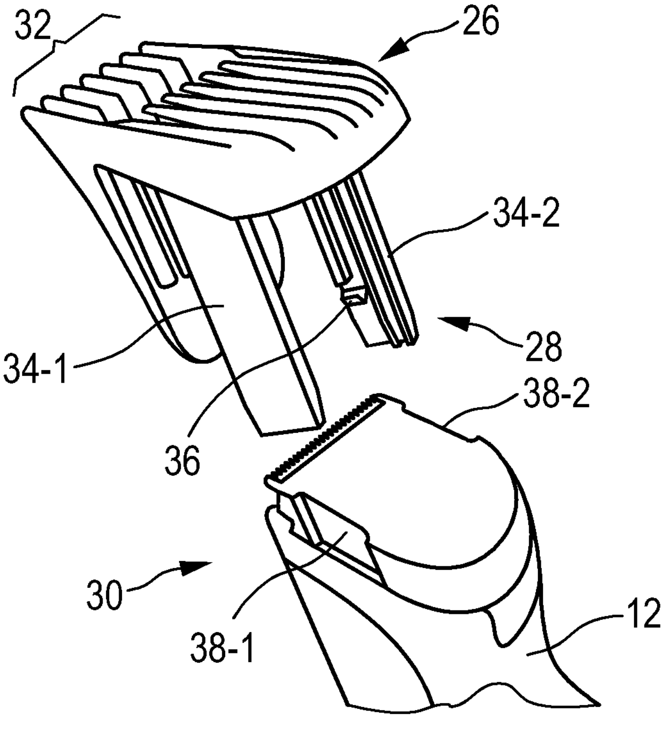
FIG. 2 shows a partial exploded perspective view of another embodiment of a hair cutting appliance and an adjustable spacing comb, wherein the spacing comb is shown in an insertion orientation.

FIG. 2 shows a partial perspective schematic illustration of a first end of a housing portion 12 of a hair cutting appliance 10. Furthermore, an adjustable spacing comb 26 is shown in an insertion orientation with respect to the housing portion 12. The housing portion 12 and the adjustable spacing comb 26 are shown in an exploded state. By way of example, the spacing comb 26 may comprise an attachment portion 28 which may comprise, for instance, sliding beams 34-1, 34-2. The attachment portion 28 may engage the housing portion 12. More particularly, the attachment portion 28 may be attached to a mounting portion 30 of the housing portion 12. To this end, the sliding beams 34-1, 34-2 may be inserted into respective mounting slots 38-1, 38-2 at the mounting portion 30. The attachment portion 28 may further comprise at least one snap-on member 36 which may be provided at at least one of the sliding beams 34-1, 34-2, for instance. The snap-on member 36 may secure the spacing comb 26 in its mounted state.

As can be further seen from FIG. 2, the spacing comb 26 may further comprise a toothed portion 32 including a plurality of comb teeth. Generally, the toothed portion 32 may comprise a slot in which the blade set 16 can be arranged in the attached state.

In some Figures as shown herein, exemplary coordinate systems are shown for illustrative purposes. As used herein, an X-axis is assigned to a longitudinal direction. Further, a Y-axis is assigned to a lateral direction. Accordingly, a Z-axis is assigned to a vertical (height) direction. Respective associations of the axes/directions X, Y, Z with respective features and extensions of the comb can be derived from those Figures. It should be understood that the coordinate system X, Y, Z is primarily provided for illustrative purposes and not intended to limit the scope of the disclosure. This involves that the skilled person may readily convert and transform the coordinate system when being confronted with further embodiments, illustrations and deviating view orientations. Also, a conversation of Cartesian coordinate systems into polar coordinate system may be envisaged, particularly in the context of a circular or curved blade set.

Figure 3:
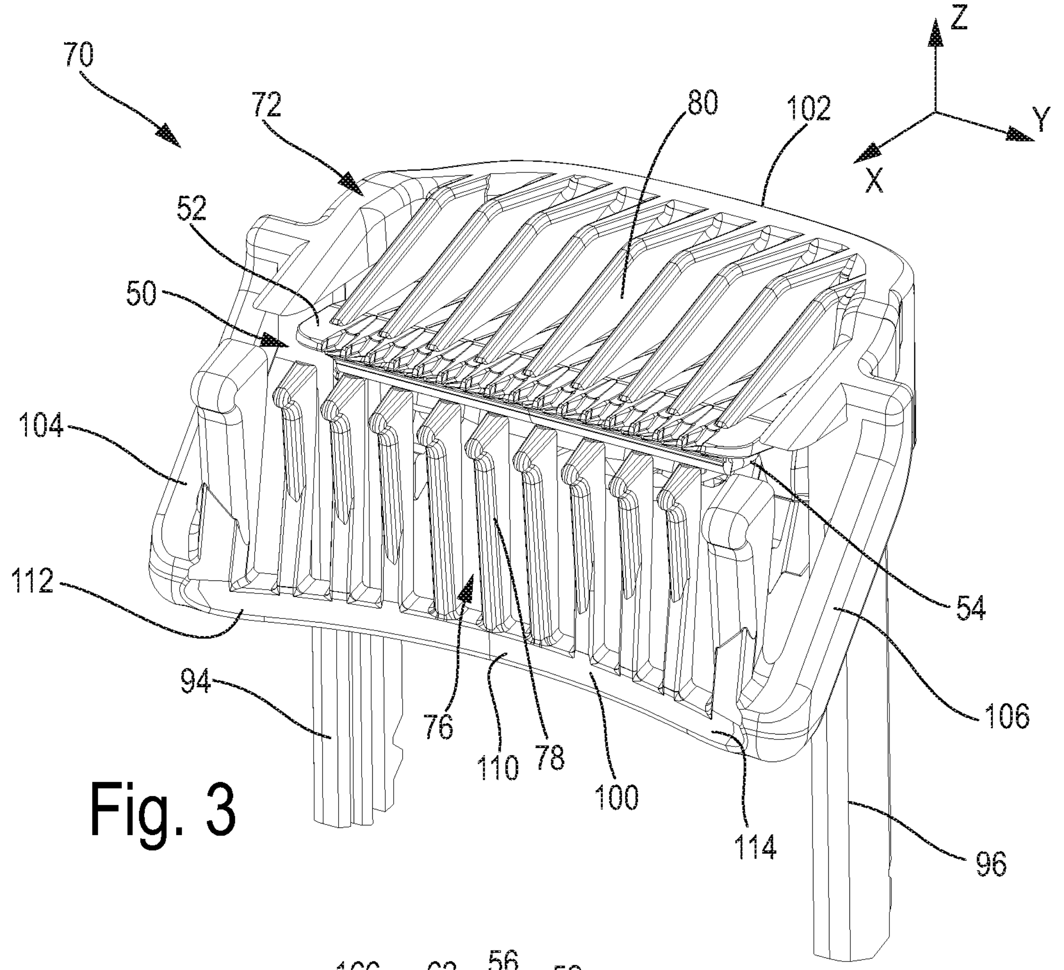
FIG. 3 shows a perspective frontal top view of a spacing comb in accordance with the present disclosure wherein for illustrative purposes further a blade set is illustrated.
Figure 4:
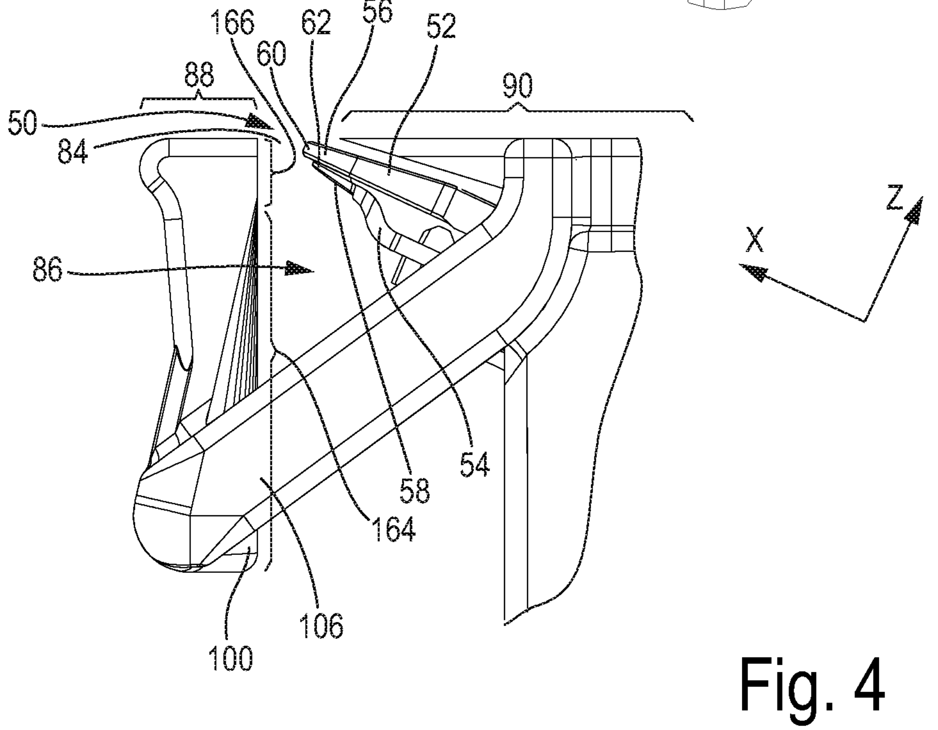
FIG. 4 shows a lateral enlarged partial view of the arrangement of FIG. 3.

Reference is made to FIG. 3 and FIG. 4, illustrating an exemplary embodiment of a spacing comb 70 in accordance with some aspects of the present disclosure. For illustrative purposes, also a blade set 50 is illustrated in FIG. 3 and FIG. 4, wherein a respective housing and/or driving mechanism is omitted. As indicated further above, the blade set 50 comprises a guard blade 52 and a cutter blade 54 that are arranged to be moved with respect to one another to cut hair therebetween. The guard blade 52 may also be referred to as stationary blade. The cutter blade 54 may also be referred to as movable blade. The guard blade 52 is facing the skin of the user when a respectively equipped appliance is used to cut hair. Hence, generally, the cutter blade 54 is arranged between the guard blade 52 and a housing portion (reference numeral 12 in FIG. 1) of the appliance.

At the guard blade 52, a series of teeth 56 having tips 60 is provided. At the cutter blade 54, a series of teeth 58 having tips 62 is provided. In the exemplary embodiment of the blade set 50 of FIG. 3 and FIG. 4, the series of teeth 56 and the series of teeth 58 are, respectively, linearly arranged. Hence, a reciprocating movement between the guard blade 52 and the cutter blade 54 effects the cutting action between the teeth 56 and the teeth 58.

In FIG. 3 and FIG. 4, coordinate systems X, Y, Z are illustrated. A main extension direction of the teeth 56 and the teeth 58 is parallel to the longitudinal direction (X-direction). A cutting plane jointly defined by the teeth 56 and the teeth 58 is basically parallel to a plane X-Y. The series of teeth 56 and/or the series of teeth 58 extend in a lateral direction (Y-direction). Perpendicular to the longitudinal direction (X-direction) and the lateral direction (Y-direction), a vertical direction (Z) is provided. A movement direction of the cutter blade 54 with respect to the guard blade 52 is parallel or nearly parallel to the lateral direction (Y-direction).

Figure 5:
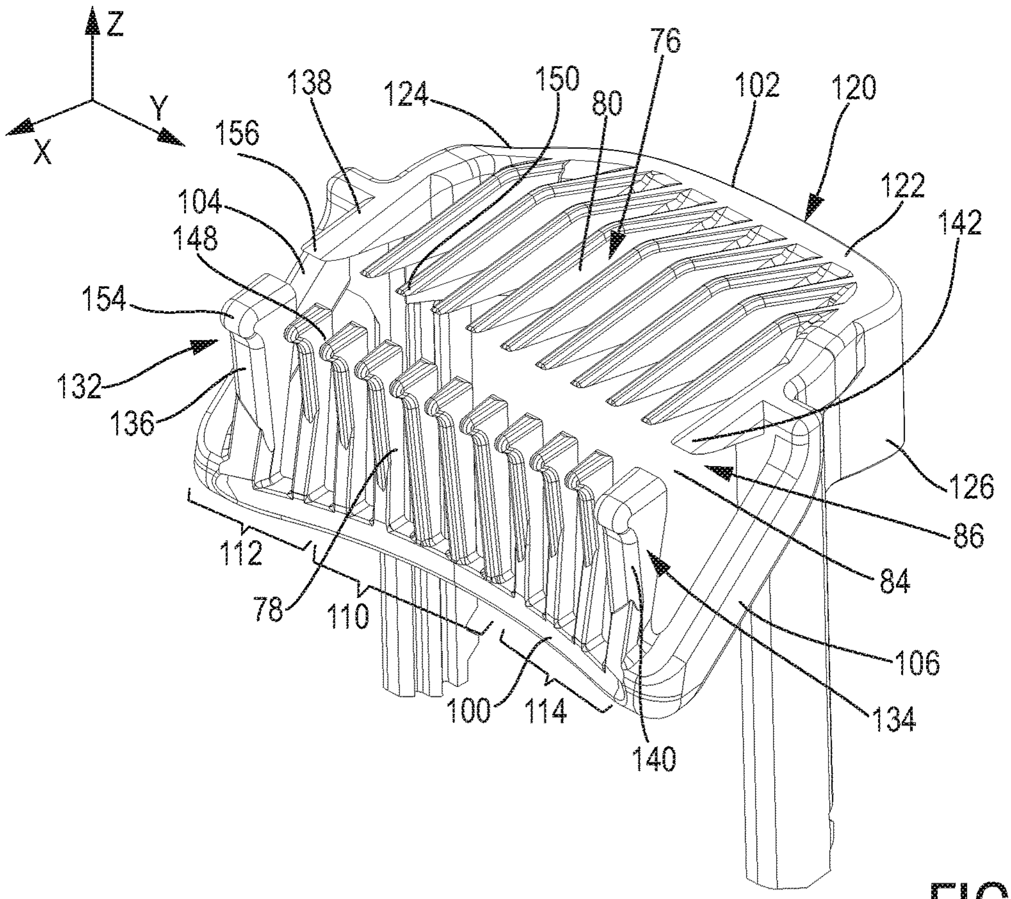
FIG. 5 shows a further perspective frontal top view of the spacing comb of FIG. 3.
Figure 6:
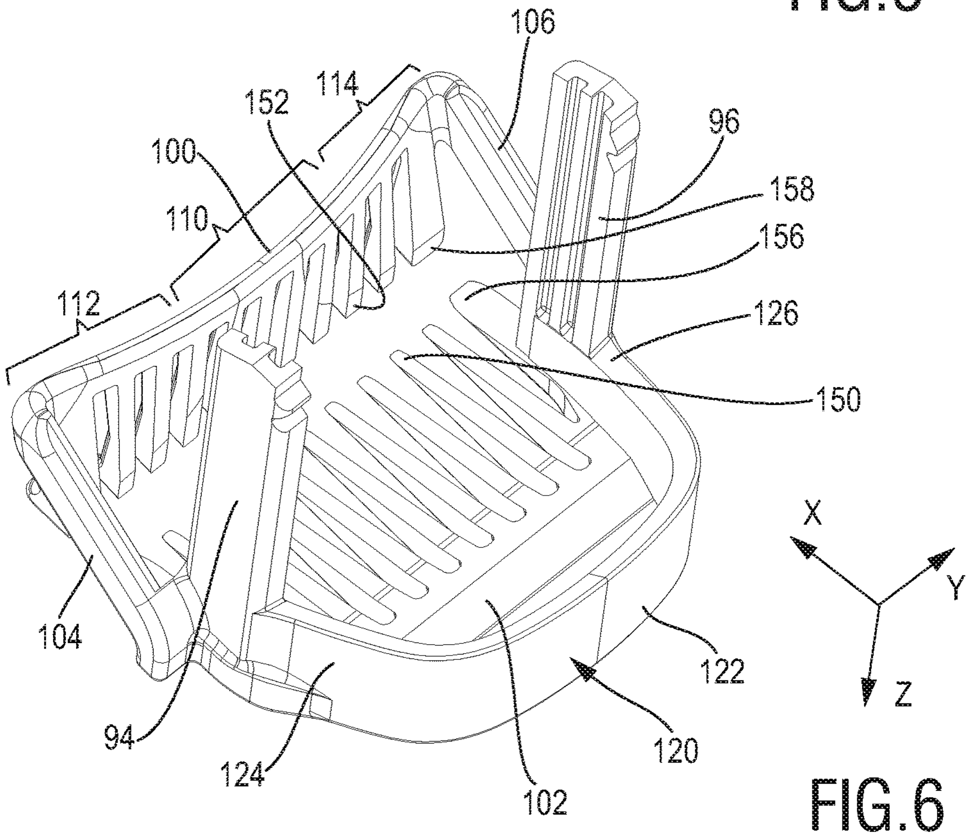
FIG. 6 shows a perspective rear bottom view of the spacing comb of FIG. 5.

Additional reference is made to FIG. 5 and FIG. 6, further detailing the spacing comb 70 of FIG. 3 and FIG. 4 in isolation.

The comb 70 comprises a support frame 72. Preferably, the support frame 72 defines a closed surrounding framework that supports comb teeth 76. As can be best seen in FIG. 5, a plurality of comb teeth 76 arranged in a series along the Y-axis is provided. The series of comb teeth 76 extends basically linear in the Y-direction. Further, a main extension direction of the comb teeth 76 is basically parallel to the longitudinal direction (X-axis).

The comb teeth 76 of the spacing comb 70 are interrupted, i.e., separated into a frontal portion 78 and a rear portion 80. Between the frontal portion 78 and the rear portion 80, a blade slot 84 is provided that is arranged to accommodate the blade set 50 therein, refer also to FIG. 3 and FIG. 4. The frontal portions 78 and the rear portions 80 of the comb teeth 76 are aligned. As discussed above, in alternative embodiments, no interrupting blade slot 84 between the frontal portion 78 and the rear portion 80 is provided. Rather, a non-interrupting blade recess may be formed of the bottom side of the comb teeth 76

As indicated in FIG. 4 and FIG. 5, a hair removal channel 86 is formed between the frontal portion 78 and the rear portion 80 of the comb teeth 76. The blade slot 84 forms a top end of the hair removal channel 86. The hair removal channel 86 is a laterally extending channel extending throughout the lateral extension of the comb 70.

In some sense, the design of the comb 70 is segmented into a front part 88 and a rear part 90, refer also to FIG. 4. The front part 88 involves the portion of the comb 70 that is placed in the mounted state in the vicinity of a frontal end of the housing portion 12. The rear part 90 involves the portion of the comb 70 that is rearwardly offset from the front part 88. As shown in FIG. 4, the guard blade 52 and the cutter blade 54 of the blade set 50 extend into the blade slot 84 between the front part 88 and the rear part 90 of the comb 70.

The support frame 72 comprises a frontal connector bar 100, a rear connector plate 102, a first side bar 104, and a second side bar 106. The rear connector plate 102 is opposite to the frontal connector bar 100. The side bars 104, 106 connect the frontal connector bar 100 and the rear connector plate 102. The rear connector plate 102 is rearwardly offset from the frontal connector bar 100. As discussed above, at least in certain embodiments, the rear connector plate 102 may be referred to as rear connector bar. The rear connector plate does not necessarily have to be arranged as rear end portion of the comb 70. Rather, the rear connector plate 102 is rearwardly offset from the frontal connector bar and may thus be arranged between the frontal end and the rear end of the structure forming the comb 70.

The frontal portions 78 of the comb teeth 76 extend from the frontal connector bar 100. A main extension direction of the frontal portion 78 is aligned with the vertical direction (Z-axis). The rear portions 80 of the comb teeth 76 extend from the rear connector plate 102. A main extension direction of the rear portions 80 of the embodiment shown in FIG. 5 and FIG. 6 is aligned with the longitudinal direction (X-direction). The comb teeth 76 do not connect the frontal connector bar 100 and the rear connector plate 102 as the blade slot 84 is formed therein.

The frontal connector bar 100, the rear connector plate 102 and the side bars 104, 106 define a closed support profile. The rear connector plate 102 and the frontal connector bar 100 are generally spaced away from one another in the longitudinal direction.

In accordance with a main aspect of the present disclosure, the frontal connector bar 100 is non-linear. As shown in FIG. 3 and FIG. 5, the frontal connector bar 100 is rearwardly curved (concavely curved). Consequently, a central portion 110 of the frontal connector bar 100 is inwardly displaced from lateral portions 112, 114 of the frontal connector bar. This has the effect that at the rear end of the front part 88 of the comb 70 a convex shape may be defined that facilitates hair removal. Consequently, the convex shape is not only provided at the rear end of the frontal connector bar 100, but also, at least partially, at the rear ends of the frontal portions 78 of the comb teeth 76.

In certain embodiments, the frontal connector bar 100 is rearwardly curved towards the rear connector plate 102.

In the embodiment illustrated in FIG. 5 and FIG. 6, the rear connector plate 102 of the support frame 72 forms part of a bracket 120. The bracket 120 comprises a central portion 122 and side walls 124, 126. Hence, the bracket 120 is U-shaped, seen in a top view.

The bracket 120 is provided with the rear connector plate 102 that has a basically flat shape. The central portion 122 may also be referred to as central wall. The central portion 122 and the side walls 124, 126 define a stiffening wall structure adjoining the rear connector plate 102.

The side bar 104 extends between the frontal connector bar 100 and the side wall 124 that is coupled to the rear connector plate 102. The side bar 106 extends between the frontal connector bar 100 and the side wall 126 of the rear connector plate 102.

Figure 7:
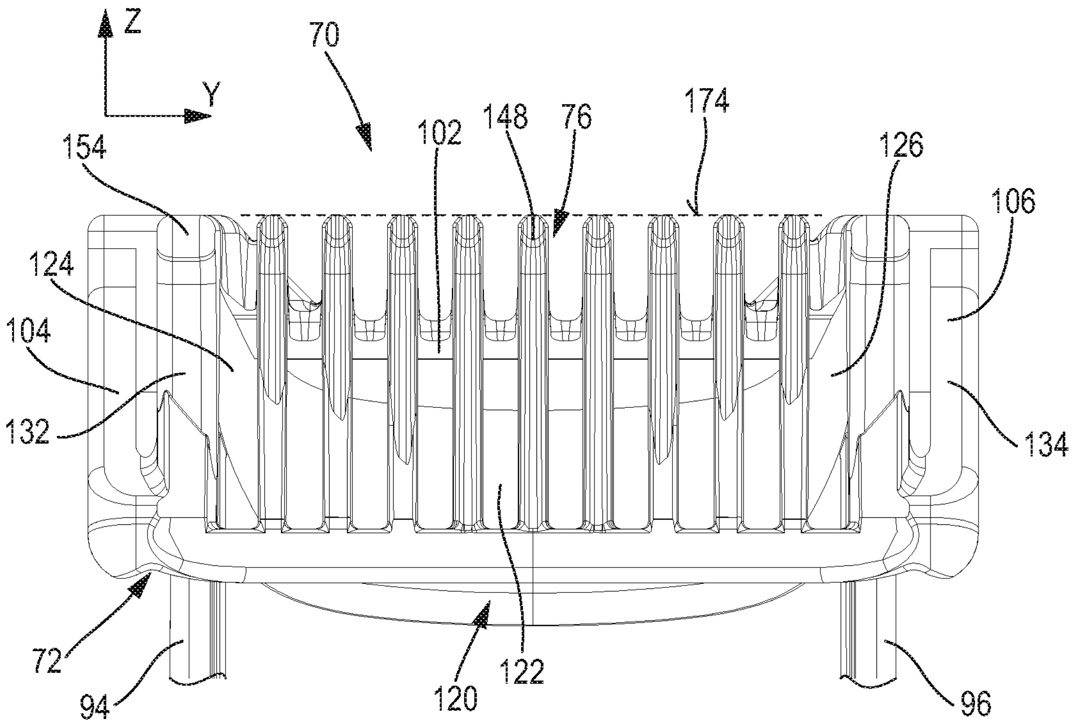
FIG. 7 shows a front view of the spacing comb of FIG. 5.
Figure 8:
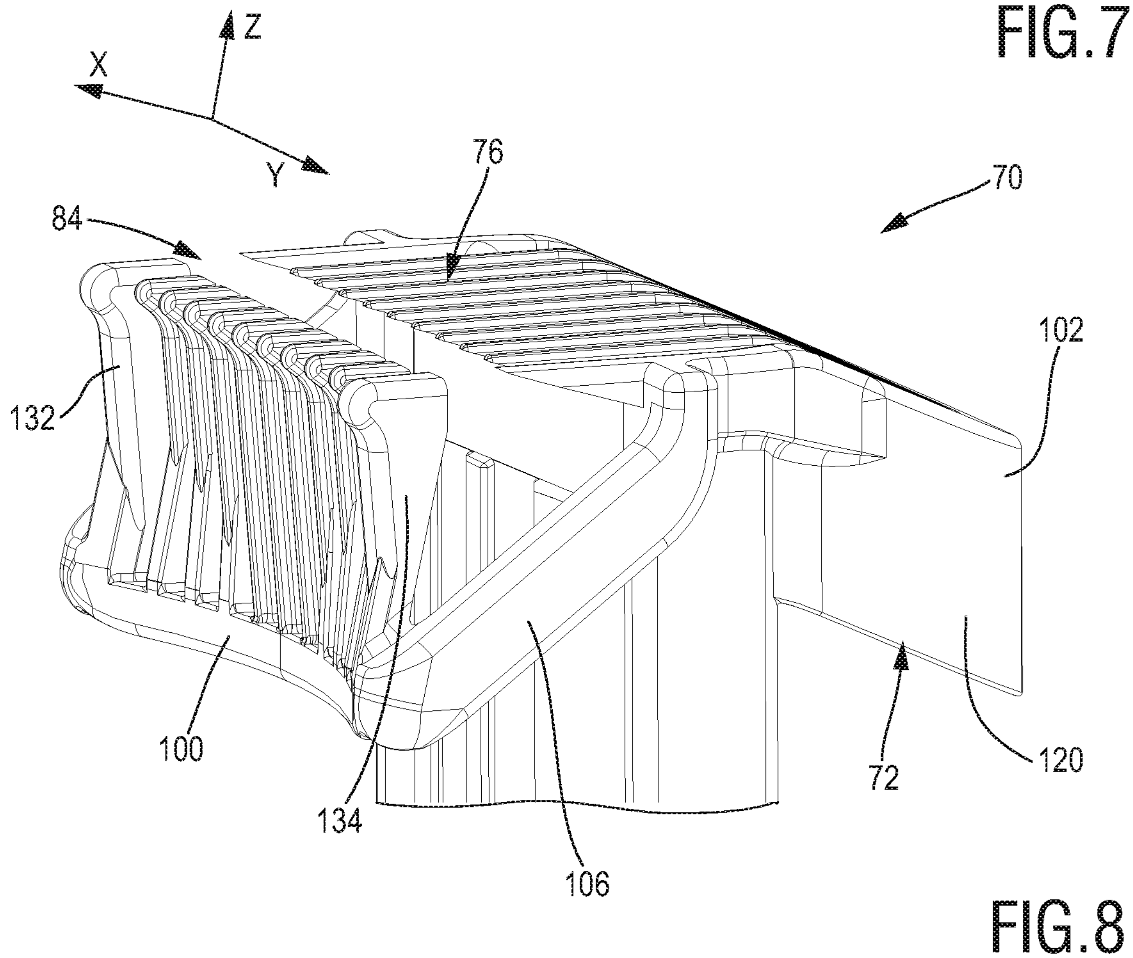
FIG. 8 shows an enlarged perspective partial side view of the spacing comb of FIG. 5.

Additional reference is made to FIG. 7 and FIG. 8. FIG. 7 is a frontal view of the comb 70. FIG. 8 is a perspective frontal top view of the comb 70 clearly showing a curvature of the frontal connector bar 100 that results in a concave frontal face and a convex rear face thereof.

The comb 70 further comprises lateral teeth involving a first outer tooth 132 and a second outer tooth 134. The outer teeth 132, 134 are provided at respective lateral ends of the series of (standard) comb teeth 76. The outer tooth 132 comprises a frontal portion 136 and a rear portion 138. The outer tooth 134 comprises a frontal portion 140 and a rear portion 142. As with the comb teeth 76, also the outer teeth 132, 134 are interrupted by the blade slot 84. Generally, the outer teeth 132, 134 are, in the lateral direction, thicker than the comb teeth 76. Further, particularly in the longitudinal direction, the outer teeth 132, 134 may protrude slightly beyond the comb teeth 76.

As can be best seen in FIG. 5 and FIG. 8, in contrast to conventional comb designs, at the comb 70, the side bars 104, 106 do not form an integral portion of the outer teeth 132, 134. Hence, also at the outer teeth 132, 134, the blade slot 84 and, consequently, the hair removal channel 86, is present. Consequently, in a lateral view, the hair removal channel 86 is not obstructed by the side bars 104, 106 that connect the front part 88 and the rear part 90.

Rather, as can be seen in FIG. 7, the side bars 104, 106 are laterally displaced from the outer teeth 132, 134 at respective lateral ends of the support frame 72. The frontal portions 78 of the comb teeth 76 are provided with frontal tips 148. The rear portions 80 of the comb teeth 76 are provided with frontal tips 150. Connecting lines of the tips 148 and 150, respectively, are basically parallel to connecting lines of the tips 60 of the guard blade teeth 56 and tips 62 of the cutter blade teeth 58. Basically, the same applies to tips 154 of the frontal portions 136, 140 of the outer teeth 132, 134, and to tips 156 of the rear portions 138, 142 of the outer teeth 132, 134.

At the rear end of the frontal portions 78 of the comb teeth 76, rear faces 152 are defined. Similarly, at the rear end of the rear portions 138, 142 of the outer teeth 132, 134, rear faces 158 are defined. The rear faces 152, 158 define a basically linear/planar boundary region for the blade slot 84 and the hair removal channel 86. By contrast, remaining sub-portions of the frontal portions 78, 136, 140 define an inwardly curved region that also forms a boundary for the hair removal channel 86.

Figure 9:
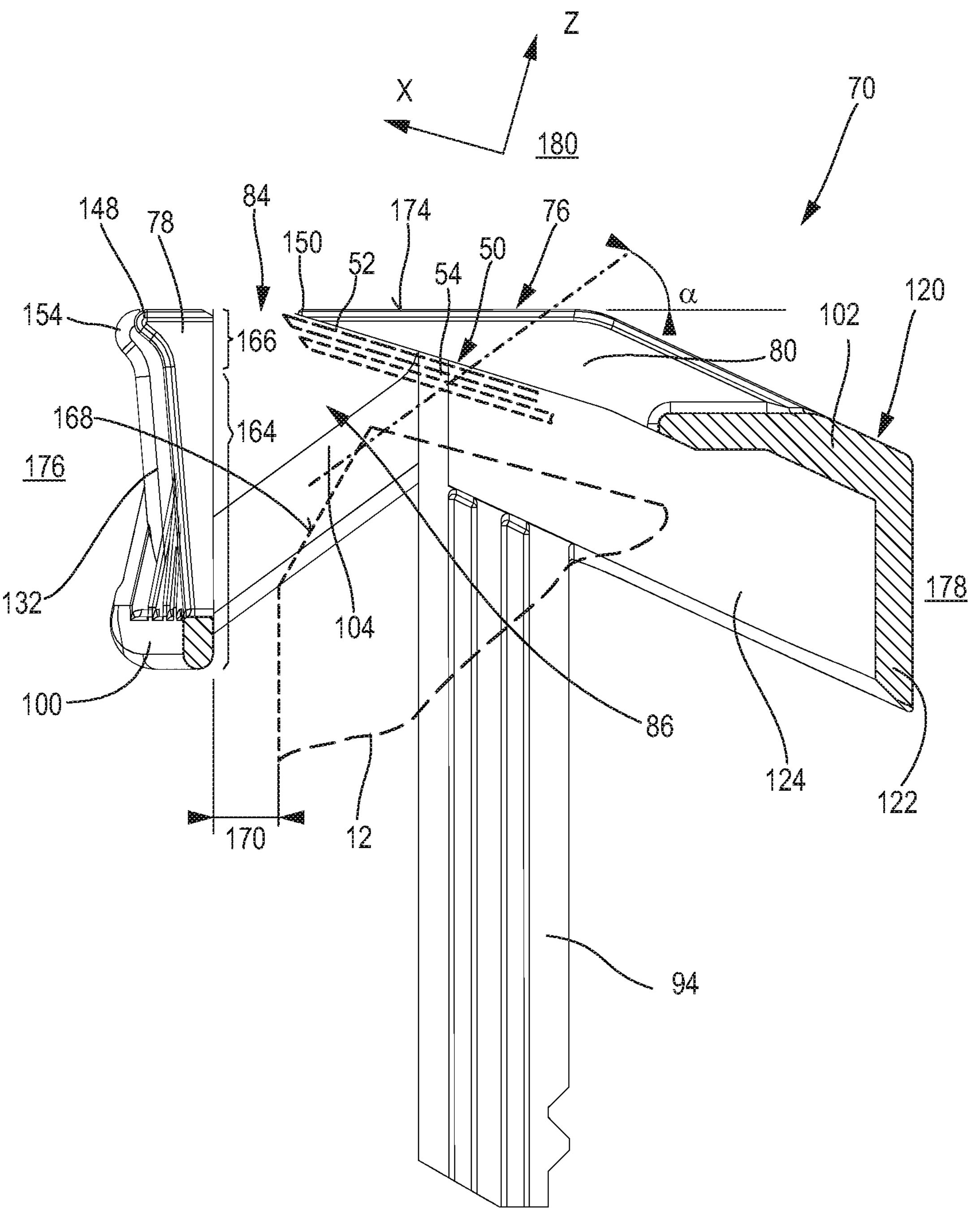
FIG. 9 shows a lateral cross-sectional view of the spacing comb of FIG. 5.

The at least slightly inwardly curved (convexly shaped as seen from the adjacent housing or housing portion 12 of the appliance) region is referred to herein as first region 164, refer to FIG. 4 and to FIG. 9. The basically linear or planar region is referred to herein as second region 166.

The second region 166 maintains the desired parallel offset from the teeth 56, 58 of the blade set 50. The first region 164 is inwardly curved and therefore provides for an improved design of the hair removal channel 86.

FIG. 9 is a simplified cross-sectional lateral view (nearly half-section) wherein the blade set 50 including the guard blade 52 and the cutter blade 54 is indicated by dashed lines for illustrative purposes.

Further, a distance between the rear end of the front part of the comb 70 and the opposite frontal end of the housing or housing portion 12 (indicated by dashed lines) is indicated by 170. Preferably, the distance 170 is greater than 1.5 mm, preferably greater than 2.0 mm. At a top end of the housing portion 12, a chamfered wall 168 is provided that may further enlarge the hair removal channel 86.

As discussed further above, the second region 166 is arranged to cooperate with the guard blade 52 and the cutter blade 54 of the blade set 50 to maintain the cutting performance. In addition, the first region 164 is specifically adapted to facilitate hair removal to avoid the clogging of hair clippings.

Further, in exemplary embodiments, a vertical extension of the second region 166 (planar region) is in the range of 1.0 to 6.0 mm (millimeter), preferably in the range of between 2.0 and 5.0 mm. Accordingly, the range of the first region (curved region) 164 is in the range of 10.0 mm to 30.0 mm, preferably in the range of 15.0 mm to 25.0 mm.

In FIG. 9, there is further indicated an angle of inclination a (alpha) of the side bars 104, 106 with respect to a top surface 174 jointly defined by the frontal portions 78 and the rear portions 80 of the comb teeth 76. Preferably, the inclination angle $\alpha$ is in the range of between 30 and 80°, preferably in the range of between 40 and 60°.

It will be appreciated by those skilled in the art that the side bars 104, 106 may of course have a different shape, involving different angles, curved shapes, transitions, segments having a different inclination, etc. Also, in this way a lateral accessibility of the hair removal gap (channel) 86 may be achieved.

In FIG. 9, a front end of the comb 70 is indicated by 176. Similarly, a rear end is indicated by 178. A top end is indicated by 180. The top surface 174 is facing the top end 180.

Hence, in certain embodiments, the rear connector plate 102 and the frontal connector bar 100 are generally spaced away from one another a direction that is basically parallel to the top surface 174 and basically perpendicular to the lateral direction (Y-direction).

Figure 10:
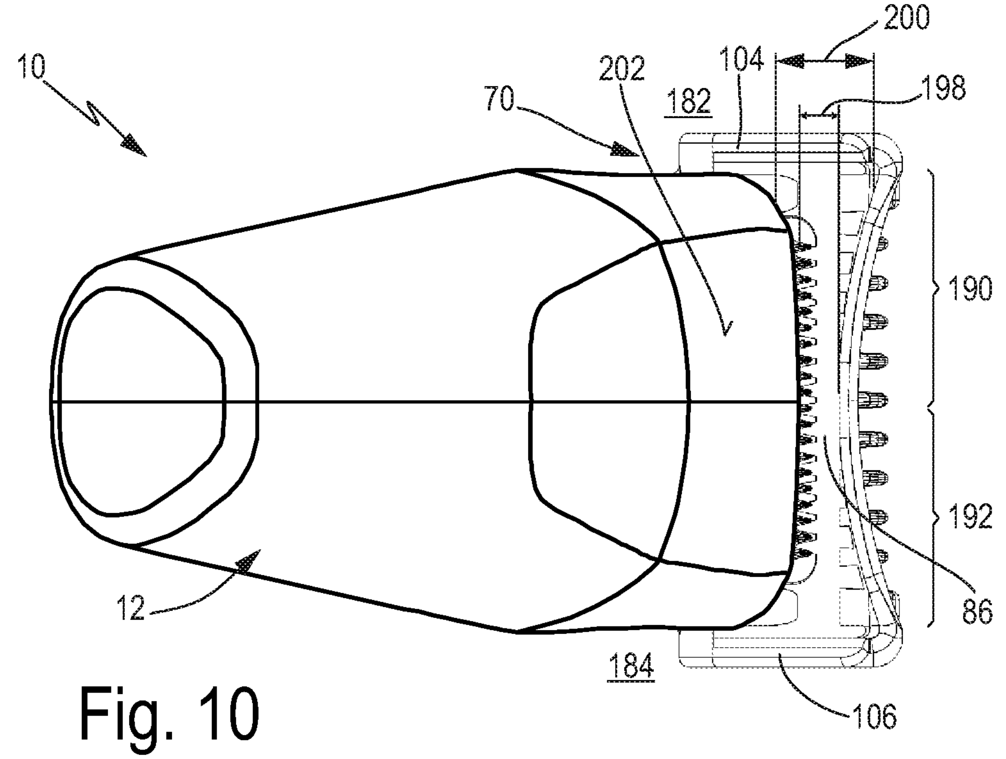
FIG. 10 shows a schematic bottom view of a hair cutting appliance that is equipped with a spacing comb in accordance with the present disclosure.
Figure 11:
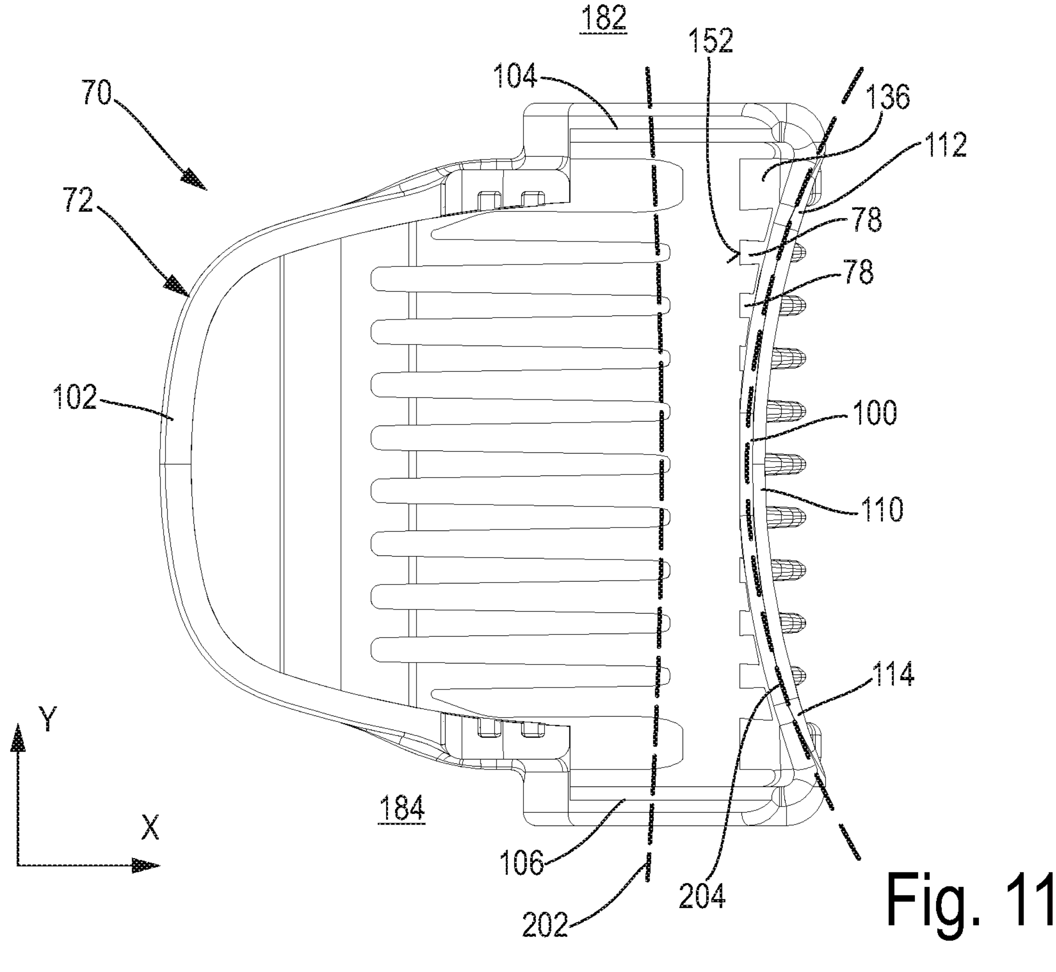
FIG. 11 shows a bottom view of the spacing comb of FIG. 10 in isolation.

Further reference is made to FIG. 10 and FIG. 11. FIG. 10 is a bottom view of a hair cutting appliance 10 to which a spacing comb 70 as discussed herein before is attached. FIG. 11 is a bottom view of the spacing comb 70 in isolation.

In FIG. 10, lateral ends of the comb 70 are indicated by 182, 184. Hence, the side bar 104 is arranged at the lateral end 182. The side bar 106 is arranged at the lateral end 184. Opposite to the first region 164 (FIG. 4 and FIG. 9), also the housing portion 12 of the appliance 10 is at least slightly curved, refer to reference numeral 202. That is, between the curvature 202 of the housing portion 12 and the first region (curved region) 164 of the comb 70, two funnel portions 190, 192 are formed. Narrow ends of the funnel portions 190, 192 merge into one another adjacent to the central region 110. Wide openings of the funnel portions 190, 192 are facing away from one another at the lateral ends 182, 184 of the comb 70.

The narrow sections of the funnel portions 190, 192 are defined by a first clearance 198 between the first region 164 and the housing portion 12 of the appliance. The wide openings of the funnel portions 190, 192 are defined by a respective second clearance 200 at the lateral ends 182, 184.

In FIG. 11, the opposite curvatures of the convex curvature 202 of the housing portion and a resulting concave curvature 204 (as seen from the outside, in front of the frontal tips 148 of the teeth 76) of the comb 70 are indicated by curved lines.

The above proposed design greatly improves the hair removal capacity at the interface between the housing portion 12 of the appliance and the front part 88 of the comb 70.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A spacing comb for a hair cutting appliance, the comb comprising:

a support frame comprising side bars; and a first series of comb teeth comprising frontal portions and a second series of comb teeth comprising rear portions spaced from the frontal portions, wherein the frontal portions and the rear portions jointly define a top surface of the comb, wherein the first series of comb teeth and the second series of comb teeth extend from the support frame, the support frame comprises a rear connector plate connected to each of the second series of comb teeth and a frontal connector bar connected to each of the first series of comb teeth, the first series of comb teeth extend from the frontal connector bar, the frontal connector bar is inwardly and rearwardly curved towards the rear connector plate, such that a central portion of the frontal connector bar is rearwardly offset from lateral portions thereof, and the curvature of the frontal connector bar results in a concave frontal face and a convex rear face thereof, wherein the side bars are arranged at an angle of between 30° and 60° with respect to the top surface.

2. The comb as claimed in claim 1, wherein the frontal connector bar is provided with a concave shape, seen in a top view, wherein the frontal portions define frontal tips and rear faces that are arranged in a line that is linear or curved, and wherein a connecting line of the rear faces is linear or has a curvature smaller than a curvature of the frontal connector bar.

3. The comb as claimed in claim 1, wherein the frontal portions are arranged in series and define, at rearwardly facing side thereof, a first region and a second region, and wherein, seen in a top view, the first region is rearwardly curved and the second region is planar.

4. The comb as claimed in claim 1, wherein:

the rear connector plate is opposite to the frontal connector bar, and the side bars extend between the frontal connector bar and the rear connector plate.

5. The comb as claimed in claim 4, wherein the rear portions extend from the rear connector plate.

6. The comb as claimed in claim 4, wherein, seen in a lateral view, the comb is unobstructed in a hair removal region adjacent to the top surface.

7. The comb as claimed in claim 4, wherein the frontal connector bar is downwardly offset from the top surface.

8. The comb as claimed in claim 4, wherein the side bars are arranged at an angle with respect to the top surface to connect the frontal connector bar and the rear connector plate.

9. The comb as claimed in claim 4, wherein the side bars are inclined with respect to the top surface.

10. The comb as claimed in claim 4, wherein the rear connector plate is arranged at a bracket comprising the rear connector plate, a central portion and two side walls to which the side bars are connected, and wherein the side bars connect the frontal connector bar and the side walls and bridge an offset therebetween.

11. The comb as claimed in claim 10, further comprising two sliding beams extending from the side walls of the rear connector plate, wherein the two sliding beams are arranged to be capable of insertion in a mounting receptacle of the appliance.

12. The comb as claimed in claim 4, further comprising a first outer tooth at a first lateral end and a second outer tooth at a second lateral end, the first outer tooth and the second outer tooth each having a frontal portion and a rear portion, wherein the first series of comb teeth and the second series of comb teeth are arranged between the first outer tooth and the second outer tooth, and wherein the side bars are separated from the outer teeth and form lateral end pieces of the comb.

13. A hair cutting appliance, comprising a housing portion, a cutting unit including a blade set, and a spacing comb as claimed in claim 1, wherein the comb is arranged to be attached to the housing portion in such a way that a hair removal gap between the housing portion and a front part of the comb is formed.

14. The appliance as claimed in claim 13, wherein the hair removal gap has a first clearance at the central portion and a second clearance at the lateral portions of the frontal connector bar, wherein the second clearance is greater than the first clearance.

15. The appliance as claimed in claim 13, wherein the housing portion is convexly shaped in a region adjacent to the front part.

16. The appliance as claimed in claim 13, wherein the hair removal gap is, in a bottom view, funnel shaped comprising a narrowing first funnel portion and a widening second funnel portion arranged between a first lateral end to a second lateral end, wherein the first funnel portion and the second funnel portion are opposite and face one another, and wherein narrow sections of the first funnel portion and the second funnel portion merge into one another.

17. The appliance as claimed in claim 13, wherein the blade set comprises a cutter blade and a guard blade, wherein the comb is adapted to fit over teeth of the cutter blade and teeth of the guard blade, wherein tips of the teeth of the cutter blade are arranged in series, wherein frontal tips of the first series of comb teeth are arranged in series, and wherein the series of comb teeth tips and the series of cutter blade tips are parallel to one another.

* * * * *